(12) United States Patent
Biegling et al.

(10) Patent No.: US 10,124,718 B2
(45) Date of Patent: Nov. 13, 2018

(54) ATTACHMENT DEVICE

(71) Applicant: Dr. Ing. h.c. F. Porsche Aktiengesellschaft, Stuttgart (DE)

(72) Inventors: Joerg Biegling, Weil der Stadt (DE); Gerald Hiesl, Herrenberg-Oberjesingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/672,276

(22) Filed: Mar. 30, 2015

(65) Prior Publication Data

US 2015/0283938 A1 Oct. 8, 2015

(30) Foreign Application Priority Data

Apr. 3, 2014 (DE) .......................... 10 2014 104 720

(51) Int. Cl.
*B60Q 1/26* (2006.01)
*B60Q 1/28* (2006.01)
*B60Q 1/30* (2006.01)

(52) U.S. Cl.
CPC ............. *B60Q 1/2626* (2013.01); *B60Q 1/28* (2013.01); *B60Q 1/30* (2013.01); *B60Q 1/302* (2013.01)

(58) Field of Classification Search
CPC .......... B60Q 1/2626; B60Q 1/28; B60Q 1/30; B60Q 1/302; B60Q 1/2665; B60Q 1/2653; B60Q 1/2623; B60Q 1/0433; B60Q 1/0441; B60Q 1/045; B60Q 1/0458; B60Q 1/0483; B60Q 1/068; B60Q 1/11; B60Q 1/2642; B60Q 1/00; B60Q 1/0029; B60Q 1/0035; B60Q 1/0683; B60Q 1/2649; B60R 1/1207; F16B 5/0642; F16B 37/043; F16B 5/06; F16B 37/04; F16B 37/045; F16B 37/046; F16B 5/065

See application file for complete search history.

(56) References Cited

U.S. PATENT DOCUMENTS

| 1,495,111 | A | * | 5/1924 | Roescher | ............... | B60Q 1/124 |
| | | | | | | 362/48 |
| 1,641,750 | A | * | 9/1927 | Farmer | .................... | B60Q 1/24 |
| | | | | | | 362/298 |
| 2,836,214 | A | * | 5/1958 | Rapata | .................... | F16B 12/30 |
| | | | | | | 174/153 G |

(Continued)

FOREIGN PATENT DOCUMENTS

| DE | 3446230 A1 | 7/1985 |
| DE | 43 21 389 | 1/1995 |

(Continued)

OTHER PUBLICATIONS

English Translation of Chinese Office Action dated Sep. 2, 2016.

*Primary Examiner* — Anh Mai
*Assistant Examiner* — Fatima Farokhrooz
(74) *Attorney, Agent, or Firm* — Gerald E. Hespos; Michael J. Porco; Matthew T. Hespos

(57) ABSTRACT

An attachment device for a light strip on the tail or the nose of a motor vehicle is provided. The light strip is connected in a securely fixed manner at its free ends by attachment bolts. A further attachment bolt and a spring bias a central region of the light strip toward the vehicle, but permit limited movement of the light strip away from the vehicle in response to expansion of the light strip.

7 Claims, 2 Drawing Sheets

(56) References Cited

U.S. PATENT DOCUMENTS

| | | | | | |
|---|---|---|---|---|---|
| 3,352,195 | A | * | 11/1967 | Fisher | F16B 37/043 24/453 |
| 4,358,234 | A | * | 11/1982 | Takegawa | F16B 5/0642 411/182 |
| 4,652,036 | A | * | 3/1987 | Okamoto | B62D 35/007 244/123.1 |
| 5,444,603 | A | * | 8/1995 | Otsuka | B60Q 1/0683 362/273 |
| 5,732,920 | A | * | 3/1998 | Reynoso | F16M 11/06 248/278.1 |
| 5,765,940 | A | * | 6/1998 | Levy | B60Q 1/2696 362/227 |
| 7,220,032 | B2 | * | 5/2007 | Mori | B60Q 1/2615 296/180.1 |
| 7,431,485 | B1 | * | 10/2008 | Saward | B60Q 1/2611 362/240 |
| 2006/0123668 | A1 | * | 6/2006 | Campanella | E01H 5/066 37/268 |
| 2006/0203504 | A1 | * | 9/2006 | Mori | B60Q 1/2615 362/541 |
| 2008/0117643 | A1 | * | 5/2008 | Matsumura | B60R 1/1207 362/494 |
| 2016/0160515 | A1 | * | 6/2016 | Wallance | E04F 10/005 52/79.1 |

FOREIGN PATENT DOCUMENTS

| | | |
|---|---|---|
| DE | 4321389 C2 | 12/1995 |
| EP | 0963307 B1 | 5/2001 |
| JP | 58172105 U | 11/1983 |
| KR | 20000070974 A | 11/2000 |
| WO | 9838063 | 9/1998 |

\* cited by examiner

ATTACHMENT DEVICE

CROSS REFERENCE TO RELATED APPLICATION

This application claims priority under 35 USC 119 to German Patent Appl. No. 10 2014 104 720.6 filed on Apr. 3, 2014, the entire disclosure of which is incorporated herein by reference.

BACKGROUND

1. Field of the Invention

The invention relates to an attachment device for a light strip arranged on the tail of a motor vehicle and held between tail lights.

2. Description of the Related Art

DE 43 21 389 C2 discloses a cover arranged between two lights. The cover is secured centrally with respect to the body. The lights are connected at one end to the cover and at the other end to the body. The connection between the light and the cover can be displaced and can be snap-fit in a horizontal plane. The light strip formed from the light and the cover thus is mounted centrally and at its end points. Any thermal expansion first is taken up by the longitudinal displaceability of the connection between the lights and the cover and do not give rise to thermal stresses. Further thermal expansion can be taken up by a buckling of the connection between the light and the cover.

The invention is based on the object of achieving an attachment device for a light strip of a motor vehicle where the attachment device ensures a defined expansion of the light strip in the X direction in the event of thermal loads.

SUMMARY OF THE INVENTION

The invention relates to a light strip with attachment bolts that hold and fix each free end of the light strip securely to a vehicle body shell, for example, to the tail cladding or to a lid. The light strip is secured to the vehicle body shell in the central region by a further attachment bolt so that it is free to move in the X direction. Any expansion of the light strip in the longitudinal direction of the vehicle can thus be made possible with a defined permitted movement of the light strip via the attachment bolt arranged in the central region between the light strip and the vehicle body shell or the body.

The attachment bolts at the free ends of the light strip may comprise a head arranged in a groove-shaped recess of the light strip for secure fixed connection of the light strip to the vehicle body shell. The head can be attached to the vehicle body shell by a threaded nut with an interposed disk. The attachment bolts secure the light strip to the body shell with the free ends fixed so that an exact arrangement with respect to the body with precise joint dimensions is ensured.

The central attachment bolt may comprises a head arranged in a groove-shaped recess of the light strip and a curved spring plate held and attached to the free end of the bolt by a bolt shoulder for attaching the light strip movably to the vehicle body shell. The spring plate supports itself elastically with its free projecting ends on the vehicle body shell so that the light strip is free to move in the X direction.

The spring plate may be replaced by a coil spring. The spring plate or the coil spring allows the light strip to expand. The component movement of the light strip can also be guided by the light strip being attached centrally with defined permitted movement, e.g. by "nesting" the bolt with a limited travel.

The light strip may have a large longitudinal extent and may be made of a different material than the nose parts or tail parts of the vehicle and the thermal loads may have different material expansions. Thus, by virtue of the central, flexible and/or resilient attachment of the light strip to the body, the light strip is allowed to expand via the curvature of the component.

One exemplary embodiment of the invention is represented in the drawings.

DETAILED DESCRIPTION OF THE PREFERRED EMBODIMENTS

Figure 1:
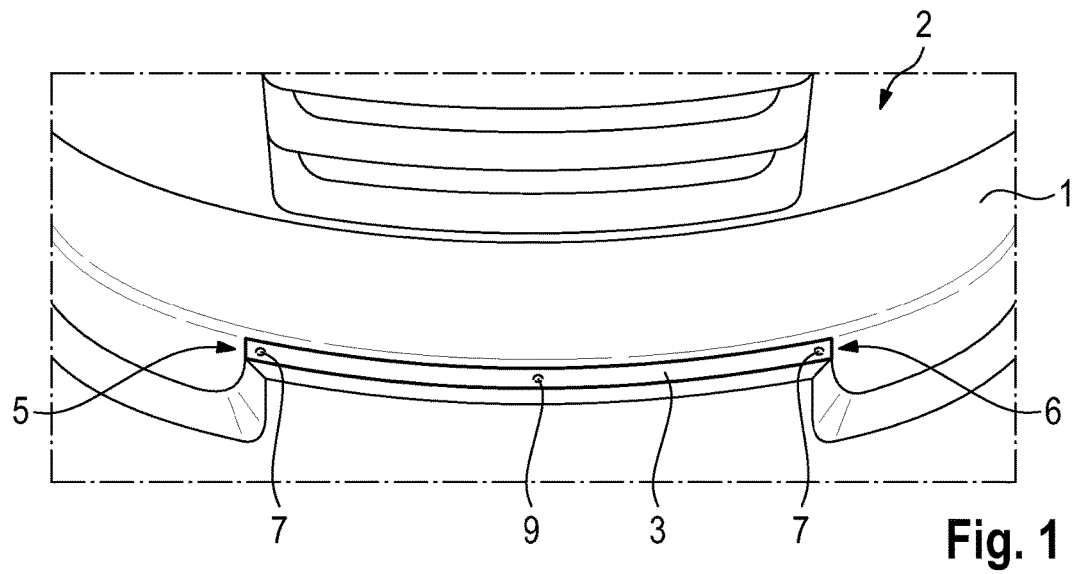
FIG. 1 is a rear view of a tail of a motor vehicle with a light strip arranged between tail lights and having outer fixed attachments and a central flexible attachment.
Figure 2:
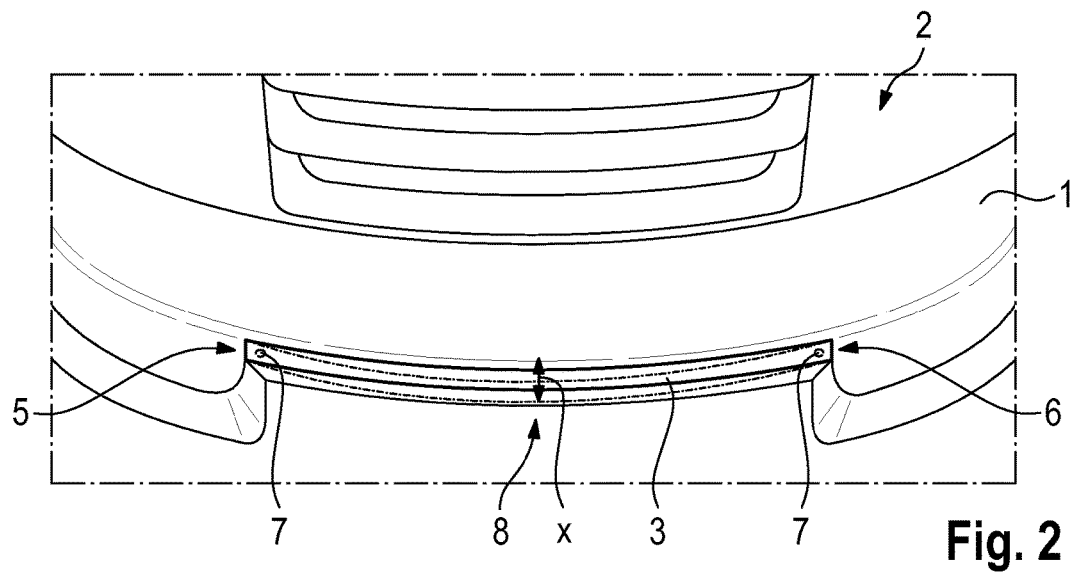
FIG. 2 is a rear view of the vehicle tail with the arrangement of the outer attachments of the light strip and a possible movement region in the X direction.
Figure 3:
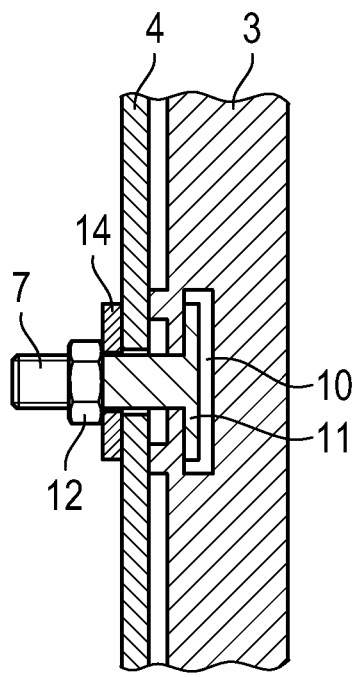
FIG. 3 is a section view of the attachment bolt for securely fixing the light strip to the vehicle body shell at the outer free ends.
Figure 4:
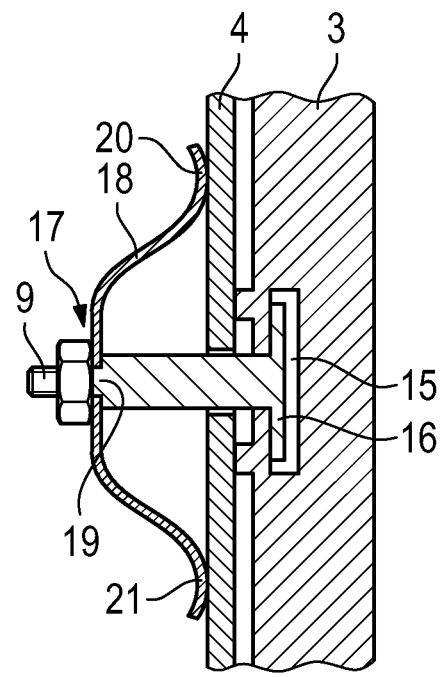
FIG. 4 is a section view of the attachment bolt with a spring plate for flexibly fixing the light strip to the vehicle body shell in a central region.

A light strip 3 arranged on the nose or tail 1 of a vehicle 2 is held on the vehicle body shell 4 by an attachment device.

The light strip 3 is held and fixed securely to the vehicle body shell 4 at each of its free ends 5, 6 by attachment bolts 7. A further attachment bolt 9 is arranged in the central region 8 of the light strip 3 and holds the light strip 3 on the vehicle body shell 4 movably or flexibly in the X direction (longitudinal direction) of the vehicle 2 to compensate for a material expansion due to temperature differences.

Each outer attachment bolt 7 has a head part 11 arranged in an undercut groove-shaped recess 10 of the light strip 3 for secure fixed connection of the light strip 3 to the vehicle body shell 4. The attachment bolts 7 can be attached to the vehicle body shell 4 by a threaded nut 12 with an interposed disk 14.

The central attachment bolt 9 for movably attaching the light strip 3 to the vehicle body shell 4 consists of a head 16 of the bolt 9 arranged in the groove-shaped recess 15 of the light strip 3. A central part of the curved spring plate 18 is held on a shoulder 19 near the free end 17 of the bolt 9 by a nut and opposite free ends 20, 21 of the curved spring plate 18 are biased against the vehicle body shell 4 so that the light strip 3 is free to move elastically in the X direction.

Figure 5:
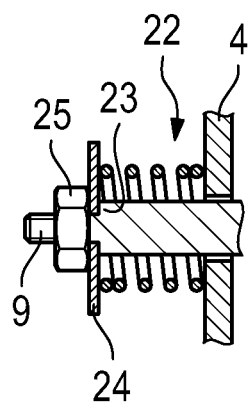
FIG. 5 is a further embodiment of an attachment bolt with a coil spring for flexibly fixing the light strip to the vehicle body shell in a central region.

A further embodiment is shown in FIG. 5, and has a coil spring 22 held on the bolt 9. The spring 22 extends between a disk 24 held on a shoulder 23 of the bolt 9 and secured by a threaded nut and the vehicle body shell 4 so that the light strip 3 is free to move in the X direction.

What is claimed is:

1. A light strip assembly arranged on a body shell at a tail of a motor vehicle and held between tail lights, the body shell being made from a first material and having an outer surface facing outward and rearward on the vehicle and with respect to a longitudinal direction of the vehicle, the body shell further having an inner surface facing inward and forward on the vehicle, and left and right opposed facing surfaces in proximity to the respective tail lights, the light strip assembly comprising:

an elongate light strip made from a second material different from the first material and having different material expansion characteristics than the first material, the light strip having opposite left and right ends in proximity respectively to the respective tail lights and substantially adjacent the respective left and right opposed facing surfaces of the body shell;

left and right outer attachment bolts securely fixing the opposite left and right ends of the light strip to the outer surface of the body shell substantially adjacent the respective left and right opposed facing surfaces of the body shell;

a central attachment bolt disposed centrally between the left and right outer attachment bolts, the central attachment bolt having a head mounted to a central region of the light strip between the left and right ends, a shank extending in the longitudinal direction of the vehicle from the head and passing through the body shell;

a nut secured to the shank at a position facing the inner surface of the body shell with limited movement of the central region of the light strip in the longitudinal direction of the vehicle toward and away from the rearward and outward facing outer surface of the body shell while restricting movement transverse to the shank; and a spring between the nut and the inner surface of the body shell for biasing the central region of the light strip toward the outer surface of the body shell, whereby thermal expansion of the light strip relative to the body shell causes a movement of the central region of the light strip rearward in the longitudinal direction of the vehicle and away from the outer surface of the body shell while the outer attachment bolts prevent movement of the left and right ends of the light strip relative to the outer surface of the body shell or relative to the left and right opposed facing surfaces of the body shell.

2. The light strip assembly of claim 1, wherein the attachment bolts at the free ends of the light strip each comprise a head arranged in a groove-shaped recess of the light strip and each attachment bolt having a threaded foot opposite the head, a nut threaded to the foot of the attachment bolt and urging an interposed disk against the body shell.

3. The light strip assembly of claim 1, wherein the head of the central attachment bolt is arranged in a groove-shaped recess of the light strip and the spring is a curved spring plate attached on a shoulder of a free foot of the bolt, projecting ends of the spring plate being biased against the inner surface of the body shell while permitting the central region of the light strip to move in an X direction toward and away from the body shell.

4. The light strip assembly of claim 1, wherein the head of the central attachment bolt is arranged in a groove-shaped recess of the light strip, the spring is a coil spring mounted around the central attachment bolt, a disk mounted to the bolt so that the coil spring is held between the disk and the inner surface of the body shell and so that the light strip is biased against the outer surface of the body shell but can move toward and away from the outer surface of the body shell.

5. The light strip assembly of claim 1, further comprising guide ribs on a surface of the light strip facing the body panel.

6. The light strip assembly of claim 1, wherein the central attachment bolt, the body shell and the light strip are configured for non-pivotal mounting of the light strip relative to the body shell.

7. The light strip assembly of claim 1 wherein the body shell has an aperture extending therethrough from the outer surface to the inner surface, the shank of the central attachment bolt is dimensioned for linear movement through the aperture in a direction parallel to the shank.

\* \* \* \* \*